United States Patent [19]

Hirmke et al.

[11] Patent Number: 4,793,562
[45] Date of Patent: Dec. 27, 1988

[54] ELECTRIC MOTOR FOR DRIVING PROCESSING MACHINES, ESPECIALLY REFINERS, AND HAVING A ROTOR HOLDING DEVICE

[75] Inventors: Werner Hirmke, Kalchreuth; Erich Losensky, Berlin, both of Fed. Rep. of Germany

[73] Assignee: Siemens Aktiengesellschaft, Munich, Fed. Rep. of Germany

[21] Appl. No.: 84,921

[22] Filed: Aug. 12, 1987

[30] Foreign Application Priority Data

Aug. 20, 1986 [DE] Fed. Rep. of Germany ....... 3628196

[51] Int. Cl.⁴ .............................................. B02C 7/16
[52] U.S. Cl. .............................. 241/101.2; 241/261.2; 310/90; 310/112
[58] Field of Search ............... 310/90, 112; 241/101.2, 241/261.2, 261.3, 259.1, 259.2, 259.3

[56] References Cited

U.S. PATENT DOCUMENTS 3,910,511 10/1975 Leider et al. .
4,406,963 9/1983 Wolf et al. .................. 310/90 X

FOREIGN PATENT DOCUMENTS 1018379 10/1977 Canada .
860651 12/1952 Fed. Rep. of Germany .
46641 4/1981 Japan .
65-251 4/1982 Japan .
604414 9/1978 Switzerland .
2099923 12/1982 United Kingdom .

Primary Examiner—Mark Rosenbaum
Attorney, Agent, or Firm—Kenyon & Kenyon

[57] ABSTRACT

An electric motor for driving processing machines with slide bearings is designed without shaft shoulders in the regions of the slide bearings in order to achieve high axial mobility of the rotor shaft. However, so that the motor can be operated in the uncoupled condition briefly without axial displacement of the rotor, a rotor holding device is provided. The latter is fastened to the shaft end of the rotor shaft of the motor and comprises an antifriction bearing with axial load-carrying capability, whereby the rotor is given the necessary axial guidance.

7 Claims, 2 Drawing Sheets

ELECTRIC MOTOR FOR DRIVING PROCESSING MACHINES, ESPECIALLY REFINERS, AND HAVING A ROTOR HOLDING DEVICE

BACKGROUND OF THE INVENTION

The present invention relates to an electric motor with a housing and slide bearings for supporting the rotor shaft for driving processing machines, especially refiners in which the rotor shaft has no shaft shoulders in the vicinity of the slide bearings. Such a design of the rotor shaft is necessary if a major axial displacement of the rotor takes place operationally or for maintenance purposes.

Refiners are wood comminuting machines for the production of paper, in which pieces of wood are shredded between two grinding discs. They are driven, as is known, for instance, from Canadian Pat. No. 10 18 379, DE-OS No. 25 10 852, U.S. Pat. No. 3,910,511 or DE-OS No. 25 22 349, by electric motors, the refiner disc being coupled or fastened to one end of the rotor shaft. Since the processing devices, for instance, cutters of the refiner serving for comminuting the wood wear and then must be replaced, the bearings of the electric motor must be designed so that they permit a relatively large axial displacement of the rotor at standstill. Before the refiner is set in operation, it is customary to let the electric motor run for a short time without being coupled in order to determine the direction of rotation. Since such motors generally have slanted slots there is a danger with this uncoupled operation that the rotor is axially displaced in an undesired manner, since no shaft shoulders are provided in the vicinity of the slide bearings.

SUMMARY OF THE INVENTION

It is an object of the present invention to provide an electric motor for driving processing machines, especially refiners such that while a large axial movability of the rotor is provided at standstill, axial displacement cannot occur in uncoupled operation.

The above and other objects of the invention are achieved by an electric motor with a housing and slide bearings for supporting the rotor shaft for driving processing machines, especially refiners, in which the rotor shaft has no shaft shoulders in the vicinity of the slide bearings, and wherein the shaft end of the rotor shaft facing away from the processing machine or a hub located there which surrounds this shaft end is provided with means for centering and fastening a rotor holding device which comprises an antifriction bearing with axial load-carrying capacity, the inner ring of which is fixed relative to the shaft end and the outer ring relative to the housing of the motor or the housing of a part belonging to the motor or its slide bearing, for which purpose housing parts located in front of the shaft end have an opening which can be closed, and that the dimensions of the rotor holding device are chosen so that the rotor shaft is displaced a given distance for fastening thereto, away from the processing machine toward the antifriction bearing.

Because of the lack of shaft shoulders in the vicinity of the slide bearings of the motor, the rotor shaft can easily be moved at standstill. For this reason, a special rotor holding device is provided which, due to the special design of the shaft end facing away from the processing machine can be fastened thereto at this point. This rotor holding device contains an antifriction bearing which can be stressed axially and the outer ring of which is fixed at the housing parts located in the vicinity of the shaft end. This antifriction bearing assures for a short time the axial guidance of the rotor shaft if the rotor holding device is fastened to the shaft ends. By the design of the rotor holding device it is furthermore assured that the rotor, with the rotor holding device fastened, has been displaced away from the processing machine so far that load operation is not possible. The rotor shaft can rotate uncoupled therefore without damage. The rotor shaft can be brought into the position suitable for operation again only after the rotor holding device is removed.

The cost of such a rotor holding device is very small since the latter is activated only rarely and also only for a short time, whereby the antifriction bearing can be stressed more highly than is permissible for continuous stress.

It is advisable to use a grooved ball bearing as the antifriction bearing with axial load-carrying. Axial self-aligning rotor bearings or slanted ball bearings, however, would be suitable equally well.

If the drive motor of the processing machine is a synchronous motor with an exciter machine arranged on the side of the rotor shaft facing away from the processing machine with rotating rectifiers (RG exciter machine), which is surrounded by a housing in front of whose outer housing bell on the end face, the air conduction hood of the blower is located, it is advisable that the housing bell at the end face and the end wall of the air conducting hood, each contain a centered circular opening, through which the rotor holding device for fastening to the shaft end of the rotor shaft or to the end of the rotor hub can be inserted.

These openings which are required for installing the rotor holding device are advantageously closed in normal operation of the arrangement by covers. The installation of the rotor holding device is simplified if the rotor holding device can be divided into two parts by pulling the antifriction bearing from its rest position into two parts and if the diameter of the opening in the air conducting hood is larger than that of the opening in the housing bell, to which the support rim for the outer ring of the antifriction bearing can be fastened.

BRIEF DESCRIPTION OF THE DRAWINGS

In the following, the invention will be explained in greater detail, referring to the embodiment shown in FIGS. 1, 2 and 3 of the drawing, wherein.

DETAILED DESCRIPTION

Figure 1:
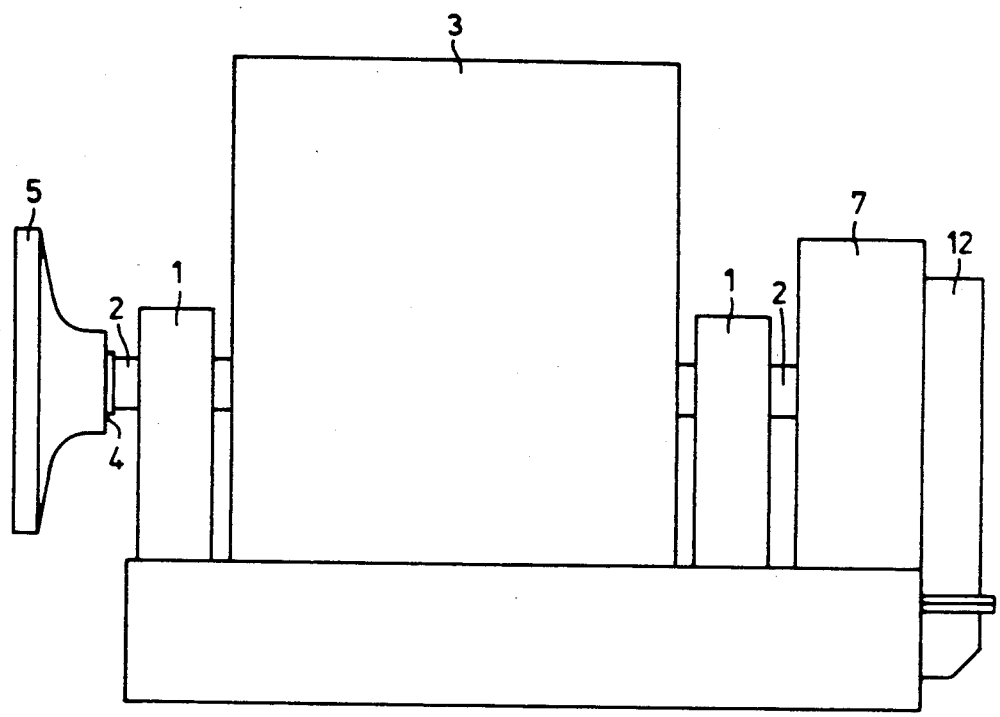
FIG. 1 shows schematically a refiner disc driven by a synchronous motor with slide bearings and an RG exciter machine.
Figure 2:
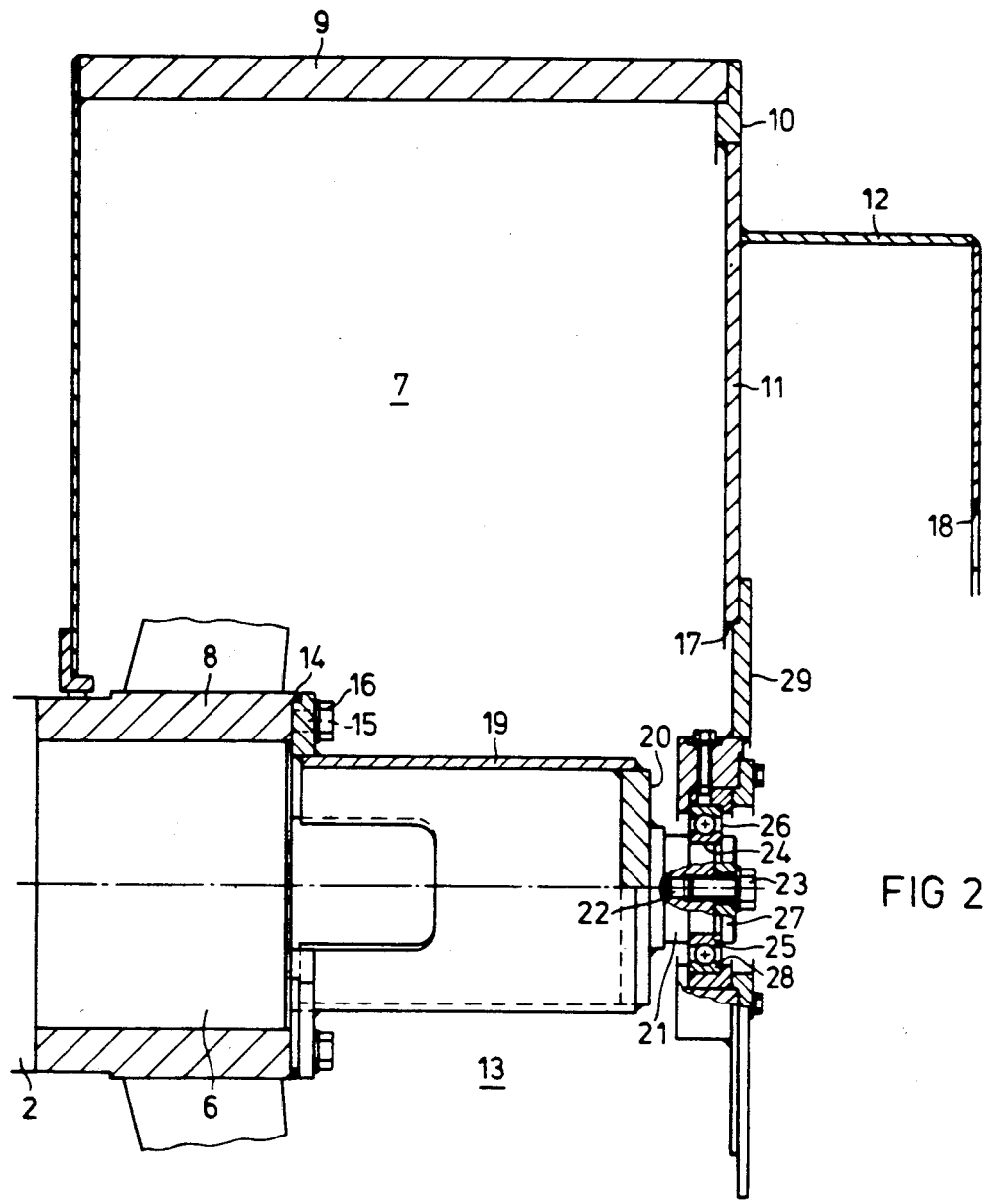
FIG. 2 shows, partially in cross section, the rotor holding device mounted at the end of the rotor hub and on the side of the RG exciter machine.
Figure 3:
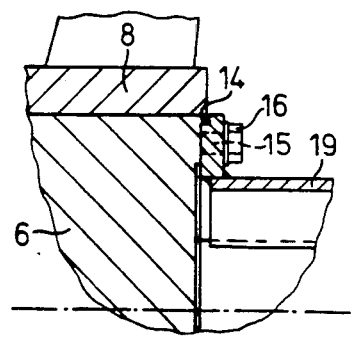
FIG. 3 shows in part the device mounted at the end of the shaft.

The rotor shaft 2 of an electric motor 3 of synchronous design supported in slide bearings 1 carries a refiner disc 5 at the one shaft end 4. At the other shaft end, the RG exciter machine 7 is arranged, the rotor hub of which surrounds the shaft end 6. See FIG. 2. The housing 9 of the RG exciter machine 7 is closed off by housing bell 11 on the end face 10 facing away from the shaft end 6. In front of the latter is further located the air conduction hood 12 of the blower which serves for cooling the RG exciter machine 7, not shown.

In the region of the slide bearings 1, the rotor shaft 2 of the synchronous motor 3 is made without shaft shoulders so that great axial mobility of the rotor shaft 2 is provided at standstill. Such a displacement becomes necessary if the cutters arranged in the refiner disc 5 must be replaced. Before the refiner is set in operation or for later inspection purposes, the synchronous motor 3 must briefly run uncoupled, for instance, in order to ascertain its direction of rotation. Since due to the lack of shaft shoulders, there is no axial guidance in the uncoupled state of the rotor, the rotor could be displaced during this uncoupled run through the slanting of the rotor slots and possible magnetic asymmetries, which is prevented by a rotor holding device 13 which is fastened to the shaft end 6 of the synchronous motor 3 before the uncoupled run starts, and fixes the rotor in the axial direction.

To this end, the rotor hub 8 of the RG exciter machine 7 is provided with a centering ring 14 and also with axial holes 15 for mounting screws 16. The housing bell 11 at the end face has a circular opening 17 centered with the rotor shaft 2, and the air conduction hood 12 has a corresponding centered circular opening 18. The diameter of the opening 18 in the air conduction hood 12 is larger than the diameter of the opening 17 in the housing bell 11. During normal operation of the refiner, the openings 17 and 18 are closed by covers.

The rotor holding device 13 comprises a bell body 19 which can be fitted in the centering ring 14 by means of a flange-like rim and is bolted with a mounting screw 16 to the rotor hub 8 of the RG exciter machine. At its end face 20, the bell body 19 carries a centered post with a center pole 22 for a set screw 23. The centered post 21 in addition has a receiving surface 24 for the inner ring 25 of an antifriction bearing 26 with axial load carrying capability which can be slipped on to the post 21. If the antifriction bearing 26 is slipped on to the post 21, the inner ring 25 is fixed by a holding washer 27 and the set screw 23.

The outer ring 28 of the antifriction bearing 26 with axial load-carrying capability is fastened in a support ring 29 which in turn can be centered at the opening 17 of the housing bell 11 and can be fastened to the housing bell 11. The antifriction bearing 26 is thus fixed relative to the shaft end 6 as well as relative to the housing bell 11. The length of the bell body 19, however, is chosen so that this fixing of the antifriction bearing 26 is possible only if the rotor shaft 2 has been displaced away from the refiner disc 5 by a predetermined distance. Thereby, the rotor shaft can then rotate uncoupled without damage.

After decoupling the synchronous motor 3, the rotor holding device is installed as follows:

First, the cover which in operation is located in the air conduction hood 12 and closes the opening 18 thereof, is removed. Thereupon, the cover for closing the opening 17 which is likewise located in the housing bell 11 is also removed. Before the rotor holding device 13 is fastened to the RG exciter machine 7 or the rotor shaft 2, the rotor holding device 13 is divided into two main parts. To this end, the centrally arranged set screw 23 and the holding washer 27 are removed. Thereupon, the antifriction bearing 26 with its support ring 29 is pulled off the post 21 of the bell body 19. This bell body 19 is then fitted in the centering ring 14 and screwed into the holes 15 with the fastening screws 16 and is thereby fastened to the rotor hub 8 of the RG exciter machine 7. Then, the rotor shaft 2 is moved in the direction toward the housing bell 11 of the RG exciter machine until the antifriction bearing 26 is slipped on its receiving surface 24 at the post 21 and can be fixed there by the set screw 23 and the holding washer 27, the support ring 29 being centered in the housing bell 11 and likewise being fastened to it. It is assured by this displacement that load operation of the refiner is not possible if the rotor holding device 13 is attached. With the so assembled rotor holding device 13, the synchronous motor 3 can run uncoupled for a short time, the antifriction bearing 26 with axial load carrying capability serving as an axial guiding bearing.

After the direction of rotation is ascertained or at the end of a checking run of the synchronous motor 3, the latter is stopped again and the procedure for disassembling of the rotor holding device 13 is in the reverse order. The rotor shaft 2 must then be brought back into its starting position. The opening 17 in the housing bell 11 of the RG exciter machine 7 and opening 18 in the air conduction hood 12 are closed by covers and after coupling, the refiner can be set in operation again.

In the foregoing specification, the invention has been described with reference to an exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

We claim:

1. An electric motor having a rotor shaft, a housing and slide bearings for supporting the rotor shaft, the motor adapted for driving a processing machine, wherein the rotor shaft has no shaft shoulders in the vicinity of the slide bearings, the electric motor having a first shaft end adapted to be coupled to the processing machine and a second shaft end facing away from the processing machine, and further wherein the second shaft end is provided with means for centering and fastening a rotor holding device comprising an antifriction bearing with axial load-carrying capacity, said bearing having an inner ring fixed relative to the second shaft end and an outer ring fixed relative to the housing, the housing comprising a housing part located in front of the second shaft end having an opening for access to the second shaft end, said opening being closable; and the length of the rotor holding device in a longitudinal direction of the rotor shaft selected so that the rotor shaft is displaced a given distance away from the processing machine in a direction toward the antifriction bearing when the rotor shaft is fastened to the rotor holding device.

2. The electric motor having a rotor holding device recited in claim 1, wherein the antifriction bearing with axial load-carrying capacity of the rotor holding device comprises a grooved ball bearing.

3. The electric motor having a rotor holding device recited in claim 1, wherein the motor comprises a synchronous motor and an exciter machine having rotating rectifiers which is arranged on a side of the rotor shaft facing away from the processing machine and is surrounded by a housing having an outer housing bell and an air conduction hood located on an end face of the outer housing bell, the end face of the housing bell and an end face of the air conduction hood each having a centered circular opening through which the rotor holding device can be inserted for fastening to the second shaft end, and the openings being closable by covers.

4. The electric motor having a rotor holding device recited in claim 1 wherein the rotor holding device comprises a bell body having an end face which carries a centered post with a receiving surface for the inner ring of the antifriction bearing which can be slipped onto the post, the outer ring being fastened in a support ring which can be fastened centered in the opening of the housing.

5. The electric motor having a rotor holding device recited in claim 4, wherein the axial length of the bell body is made so that the rotor shaft is displaced by a given predetermined distance if the antifriction bearing is pushed onto the post, secured to the post and the support ring is fastened to the housing.

6. The electric motor having a rotor holding device recited in claim 1 wherein the second shaft end is provided at an end face thereof with a centering ring and axially directed holes for mounting screws, the rotor holding device being fitted into the centering ring and being fastened by fastening means disposed in the holes.

7. The electric motor having a rotor holding device recited in claim 1 further comprising a hub surrounding the second shaft end to which the rotor holding device is attached.

* * * * *